US012366289B2

(12) United States Patent
Muff et al.

(10) Patent No.: US 12,366,289 B2
(45) Date of Patent: Jul. 22, 2025

(54) EDDY CURRENT DAMPER FOR POWER TAKE-OFF GEAR RATTLE ABATEMENT

(71) Applicant: Parker-Hannifin Corporation, Cleveland, OH (US)

(72) Inventors: Derek E. Muff, Memphis, TN (US); Bradley A. Slakans, Collierville, TN (US); Steven Wesley Bennett, Noblesville, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/912,839

(22) Filed: Jun. 26, 2020

(65) Prior Publication Data
US 2020/0408276 A1 Dec. 31, 2020

Related U.S. Application Data

(60) Provisional application No. 62/868,466, filed on Jun. 28, 2019.

(51) Int. Cl.
*F16H 57/00* (2012.01)
*B60K 17/28* (2006.01)
(Continued)

(52) U.S. Cl.
CPC ......... *F16H 57/0006* (2013.01); *B60K 17/28* (2013.01); *B60K 25/02* (2013.01);
(Continued)

(58) Field of Classification Search
CPC .......... F16H 1/04; F16H 1/06; F16H 57/0006; B60K 17/28; B60K 25/02; B60K 25/06;
(Continued)

(56) References Cited

U.S. PATENT DOCUMENTS 2,320,721 A * 6/1943 Ericson ................. H02K 49/02
310/74
4,326,158 A * 4/1982 Helgesen ............ H02P 29/0016
322/29
(Continued)

FOREIGN PATENT DOCUMENTS

DE          3800297 A1    7/1989
KR     20050053952 A    6/2005
(Continued)

OTHER PUBLICATIONS

English translation of DE 3800297 A1 (Year: 1989).*
(Continued)

*Primary Examiner* — Joseph Brown
(74) *Attorney, Agent, or Firm* — MacMillan, Sobanski & Todd, LLC

(57) ABSTRACT

A power take-off includes a housing that is adapted to be supported on a source of rotational energy, an input mechanism that is supported within the housing and adapted to be rotatably driven by the source of rotational energy, and an output mechanism that is supported within the housing and rotatably driven by the input mechanism. At least one of the input mechanism and the output mechanism includes a pair of mating gears. An eddy current damper is supported within the housing and configured to exert a drag torque on either or both of the mating gears during operation of the power take-off. The eddy current damper may provide a variable amount of such drag torque, a constant amount of such drag torque, or a combination of both.

19 Claims, 3 Drawing Sheets

(51) Int. Cl.
  *B60K 25/02* (2006.01)
  *B60K 25/06* (2006.01)
  *F16F 15/03* (2006.01)
  *F16F 15/18* (2006.01)
  *F16H 1/04* (2006.01)

(52) U.S. Cl.
  CPC ............ *B60K 25/06* (2013.01); *F16F 15/035* (2013.01); *F16F 15/18* (2013.01); *F16H 1/04* (2013.01); *B60K 2025/022* (2013.01)

(58) Field of Classification Search
  CPC .... B60K 2025/022; F16F 15/18; F16F 15/035
  USPC ............................................................ 74/11
  See application file for complete search history.

(56) References Cited

U.S. PATENT DOCUMENTS

| | | | | |
|---|---|---|---|---|
| 5,921,149 | A * | 7/1999 | Masberg | ............... H02K 7/18 464/180 |
| 9,494,227 | B2 | 11/2016 | McPherson et al. | |
| 2005/0134415 | A1 * | 6/2005 | Hill | .................. F16F 15/18 335/220 |
| 2015/0276040 | A1 | 10/2015 | Burrell et al. | |
| 2015/0362058 | A1 * | 12/2015 | McPherson | ............ B60K 17/28 74/11 |
| 2020/0132126 | A1 | 4/2020 | Hedge et al. | |
| 2021/0215242 | A1 * | 7/2021 | Vath | ...................... F16F 15/002 |

FOREIGN PATENT DOCUMENTS

| | | |
|---|---|---|
| KR | 1020050053952 A | 6/2005 |
| WO | 2018081673 A2 | 5/2018 |
| WO | 2019108868 A1 | 6/2019 |

OTHER PUBLICATIONS

European Patent Office. European Search Report for European application No. 20181723, mailed Oct. 29, 2020.
Washabaugh et al., "A Novel Application of Eddy Current Braking for Functional Strength Training during Gait", HHS Public Access, Author Manuscript, 2016, https://www.ncbi.nlm.nih.gov/pmc/articles/PMC4963313/, pp. 1-20.
European Communication pursuant to Article 94(3) EPC, Application No. 20181723.6, dated Feb. 14, 2023.

* cited by examiner

EDDY CURRENT DAMPER FOR POWER TAKE-OFF GEAR RATTLE ABATEMENT

CROSS-REFERENCE TO RELATED APPLICATIONS

This application claims the benefit of U.S. Provisional Application No. 62/868,466, filed Jun. 28, 2019, the disclosure of which is incorporated herein by reference.

BACKGROUND OF THE INVENTION

This invention relates in general to power take-offs for transmitting rotational energy from a source of rotational energy to a rotatably driven accessory. In particular, this invention relates to an improved structure for such a power take-off that minimizes the transmission of torque transients and other vibrations therethrough from the source of rotational energy to the rotatably driven accessory, which results in a significant reduction in the amount of noise that may be generated during operation.

A power take-off is a well known mechanical device that is often used in conjunction with a source of rotational energy, such as a vehicle engine or transmission, to transfer rotational energy to a rotatably driven accessory, such as a hydraulic pump that is supported on the vehicle. For example, power take-offs are commonly used on industrial and agricultural vehicles to transfer rotational energy from the vehicle engine or transmission to one or more hydraulic pumps that, in turn, are used to operate hydraulically driven accessories provided on the vehicle, such as plows, trash compactors, lifting mechanisms, winches, and the like. The power take-off provides a simple, inexpensive, and convenient means for transferring energy from the source of rotational energy to the hydraulic pump that, in turn, transfers relatively high pressure fluid to operate the driven accessory.

A typical power take-off includes a housing, an input mechanism, and an output mechanism. The power take-off housing is adapted to be supported on a housing of the source of rotational energy. The power take-off housing includes an opening that can be aligned with a corresponding opening provided in the housing of the source of rotational energy. The input mechanism of the power take-off is supported within the power take-off housing and extends outwardly therefrom through the aligned openings and into the housing of the source of rotational energy. In this manner, the input mechanism of the power take-off is connected to the source of rotational energy so as to be rotatably driven whenever the source of rotational energy is operated.

The output mechanism of the power take-off is also supported within the power take-off housing. The output mechanism is rotatably driven by the input mechanism and is adapted to be connected to the rotatably driven accessory. In some instances, the input mechanism of the power take-off is directly connected to the output mechanism such that the rotatably driven accessory is operated whenever the source of rotational energy is operated. In other instances, a clutch assembly is provided between the input mechanism and the output mechanism such that the rotatably driven accessory is operated only when the clutch assembly is engaged while the source of rotational energy is operated. In both instances, however, the power take-off includes one or more pairs of meshing gears as a part of either the input mechanism, the output mechanism, or a gear train mechanism connected between the input mechanism and the output mechanism.

It is well known that both internal combustion and diesel engines generate significant amounts of torsional vibrations during operation, primarily as a result of the non-linear nature of the combustion events occurring therein. These torsional vibrations are manifested as cyclical variations in the rotational speeds of the components of the source of rotational energy, which typically exhibit a sinusoidal pattern of alternating periods of acceleration and deceleration relative to an average rotational speed. Frequently, the input mechanism of the power take-off is rotatably driven by one of these components of the source of rotational energy. As a result, the torsional vibrations are transmitted from the source of rotational energy to the one or more pairs of meshing gears contained within the power take-off. In some instances, these torsional vibrations can result in the occurrence of a series of either single-sided or double-sided impacts between interfacing teeth of a pair of meshing gears, which usually generates an undesirable audible rattle or similar noise. This noise is often referred to as neutral rattle because it is most pronounced when the clutch of the power take-off is disengaged or when the power take-off is otherwise not driving a heavy load, which would tend to dampen these torsional vibrations.

To prevent, or at least minimize, this undesirable neutral rattle noise from occurring, the pair of meshing gears would ideally be constructed having gear teeth that mesh perfectly, with no clearance between the adjacent gear teeth flanks and, thus, no opportunity to generate the noise. However, this ideal condition is not possible because of the reality of manufacturing tolerances, so the pairs of meshing gears always have an inherent amount of tooth clearance that allows the respective gear teeth to mesh without undue wear. Nonetheless, it would still be desirable to provide an improved structure for a power take-off that dampens or otherwise attenuates these torsional vibrations and thereby reduces or eliminates the neutral rattle noise.

SUMMARY OF THE INVENTION

This invention proposes a magnetic source integral to a power take-off that is positioned such that it can advantageously use the laws of magnetism to induce an eddy current in an adjacent rotating conductive element, thereby causing a reactionary drag torque of sufficient magnitude to prevent drivetrain torsional acceleration from manifesting as gear flank rattle in a power take-off. In particular, the power take-off includes a housing that is adapted to be supported on a source of rotational energy, an input mechanism that is supported within the housing and adapted to be rotatably driven by the source of rotational energy, and an output mechanism that is supported within the housing and rotatably driven by the input mechanism. At least one of the input mechanism and the output mechanism includes a pair of mating gears. An eddy current damper is supported within the housing and configured to exert a drag torque on either or both of the mating gears during operation of the power take-off. The eddy current damper may provide a variable amount of such drag torque, a constant amount of such drag torque, or a combination of both.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
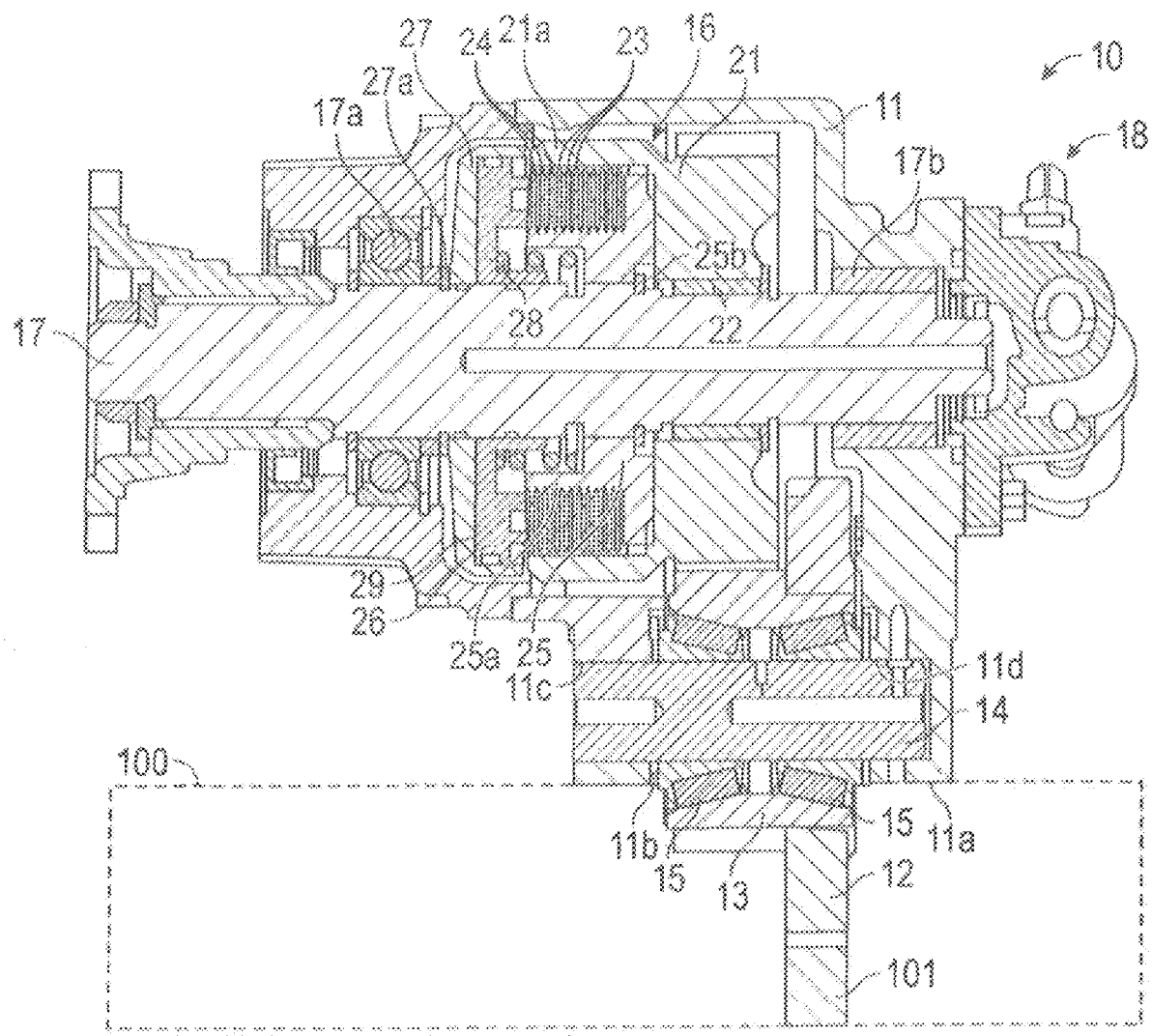
FIG. 1 is a sectional elevational view of a power take-off supported on a source of rotational energy.

Referring now to the drawings, there is illustrated in FIG. 1 a sectional elevational view of a power take-off, indicated generally at 10, in accordance with this invention. The basic structure and mode of operation of the power take-off 10 are well known in the art, and only those portions of the power take-off 10 that are necessary for a complete understanding of the invention will be described. Also, the illustrated power take-off 10 is intended merely to illustrate one environment in which this invention may be used. Thus, the scope of this invention is not intended to be limited for use with the specific structure of the power take-off 10 illustrated in FIG. 1 or with power take-offs in general. On the contrary, as will become apparent below, this invention may be used in any desired environment for the purposes described below.

The illustrated power take-off 10 includes a hollow housing 11 having a mounting surface 11a provided thereon. An opening 11b is provided through the mounting surface 11a of the power take-off housing 11. The power take-off 10 has an input mechanism that, in the illustrated embodiment, includes an input gear 12 that is rotatably supported within the power take-off housing 11. As shown in FIG. 1, a portion of the input gear 12 extends outwardly through the opening 11b provided through the mounting surface 11a.

The mounting surface 11a of the power take-off housing 11 is adapted to be secured (typically by a plurality of bolts, which are not shown) to a corresponding mounting surface provided on a housing of a source of rotational energy 100, such as an engine or a transmission of a vehicle. As is well known in the art, the portion of the input gear 12 that extends through the opening 11b of the power take-off housing 11 also extends through a corresponding opening (not shown) provided in the housing of the source of rotational energy 100 into engagement with a driving gear 101 or other rotatably driving mechanism provided therein. Thus, the input gear 12 of the power take-off 10 is rotatably driven whenever the driving gear 101 contained within the source of rotational energy 100 is rotatably driven. Alternatively, the input gear 12 of the power take-off 10 may be rotatably driven by a belt, chain, or other drive structure (not shown) that extends through the opening 11b of the power take-off housing 11 and the corresponding opening (not shown) provided in the housing of the source of rotational energy 100 into engagement with the driving gear 101 or other rotatably driving mechanism provided therein.

The illustrated input gear 12 is splined onto or otherwise supported on an input gear hub 13 for concurrent rotation to form a conventional input cluster gear. However, it is known to form the input gear 12 and the input gear hub 13 integrally from a single piece of material. In either event, the input gear hub 13 is, in turn, rotatably supported on an input shaft 14 by one or more bearings 15. First and second ends of the illustrated input shaft 14 are respectively (and typically non-rotatably) supported in first and second bores 11c and 11d provided in the power take-off housing 11.

The power take-off 10 also includes a clutch assembly, indicated generally at 16, for selectively connecting the input gear hub 13 (and, thus, the input gear 12 supported thereon) to an output shaft 17. The output shaft 17 is, in turn, adapted to be connected to the rotatably driven accessory (not shown) as described above. The illustrated output shaft 17 is rotatably supported on the power take-off housing 11 by a pair of bearings 17a and 17b, although such is not required. When the clutch assembly 16 is engaged, the input gear hub 13 is connected to the output shaft 17 for concurrent rotation. Thus, the rotatably driven accessory is rotatably driven by the source of rotational energy 100 when the clutch assembly 16 is engaged. Conversely, when the clutch assembly 16 is disengaged, the input gear hub 13 is disconnected from the output shaft 17. Thus, the rotatably driven accessory is not rotatably driven by the source of rotational energy 100 when the clutch assembly 16 is disengaged. A conventional shifter assembly, indicated generally at 18, may be provided to selectively engage and disengage the clutch assembly 16 in a known manner.

The clutch assembly 16 of the power take-off 10 includes a drive gear 21 that is rotatably driven by the input gear hub 13. The illustrated drive gear 21 includes an axially-extending hollow cylindrical bell portion 21a having a splined inner surface. The illustrated drive gear 21 is rotatably supported on the output shaft 17 by a bearing 22 and is formed integrally from a single piece of material with the hollow cylindrical bell portion 21a. However, it is known to form the drive gear 21 and the hollow cylindrical bell portion 21a from separate components that are splined or otherwise connected together for concurrent rotation. In either event, a plurality of flat annular clutch plates 23 is splined to the inner splined surface of the hollow cylindrical bell portion 21a of the drive gear 21 for rotation therewith. Thus, the drive gear 21 and the clutch plates 23 are constantly rotatably driven by the input gear 12.

A plurality of annular friction plates 24 is disposed in an alternating fashion between the clutch plates 23. The friction plates 24 are splined to an outer splined surface provided on an axially extending cylindrical portion 25a of a clutch gear 25 for rotation therewith. The clutch gear 25 is splined or otherwise secured to the output shaft 17 for rotation therewith. Thus, the friction plates 24, the clutch gear 25, and the output shaft 17 are connected for rotation together as a unit. The clutch gear 25 is restrained from axial movement in one direction (toward the right when viewing FIG. 1) by one or more retaining rings 25b that are mounted on the output shaft 17, for a purpose that will be explained below.

An annular clutch piston 26 is provided for selectively causing the clutch plates 23 and the friction plates 24 to frictionally engage one another so as to engage the clutch assembly 16. To accomplish this, the clutch piston 26 is disposed within a hollow cylindrical clutch cylinder 27. The clutch cylinder 27 has a closed end and an opened end. One end of the clutch piston 26 (the left end when viewing FIG. 1) is disposed within the clutch cylinder 27, while the opposite end of the clutch piston 26 (the right end when viewing FIG. 1) extends from the opened end of the clutch cylinder 27 adjacent to the clutch plates 23 and friction plates 24. Both the clutch piston 26 and the clutch cylinder 27 are supported on the output shaft 17. The clutch piston 26 is axially movable along the output shaft 17, but the clutch cylinder 27 is restrained from axial movement in one direction (toward the left when viewing FIG. 1) by one or more retaining rings 27a that are mounted on the output shaft 17 for a purpose that will be explained below.

A coiled clutch spring 28 reacts between the clutch piston 26 and the clutch gear 25. As discussed above, the clutch gear 25 is restrained from axial movement in one direction (toward the right when viewing FIG. 1) by the retaining ring 25b. Thus, the clutch spring 28 urges the clutch piston 26 axially in the opposite direction (toward the left when viewing FIG. 1) toward a disengaged position adjacent to the closed end of the clutch cylinder 27. In the disengaged position, the clutch piston 26 does not engage the clutch plates 23 or the friction plates 24. Thus, the clutch plates 23 and the friction plates 24 do not frictionally engage one another. As a result, the clutch gear 25 is disconnected from the drive gear 21 so as to provide no rotatable driving connection therebetween.

To engage the clutch assembly 16, the shifter assembly 18 is actuated to supply pressurized fluid to an annular clutch chamber 29 defined between the clutch piston 26 and the closed end of the clutch cylinder 27. As a result, the clutch piston 26 is moved axially in the one direction (toward the right when viewing FIG. 1) toward an engaged position. In the engaged position, the clutch piston 26 causes the clutch plates 23 and the friction plates 24 to frictionally engage one another. As a result, the clutch gear 25 is connected to the drive gear 21 so as to provide a rotatable driving connection therebetween.

Thus, as described above, the illustrated power take-off 10 includes the clutch assembly 16 between the input gear 12 and the output shaft 17 such that the rotatably driven accessory is operated only when the clutch assembly 19 is engaged while the source of rotational energy 100 is operated. In some instances, however, it may be desirable that the input gear 12 or other input mechanism of the power take-off 10 be directly or otherwise connected to the output shaft 17 or other output mechanism of the power take-off 10 such that the rotatably driven accessory is operated whenever the source of rotational energy 100 is operated. For example, the output shaft 17 may be directly rotatably driven by the input gear 12 by means of a chain, belt, or other mechanism.

Figure 2:
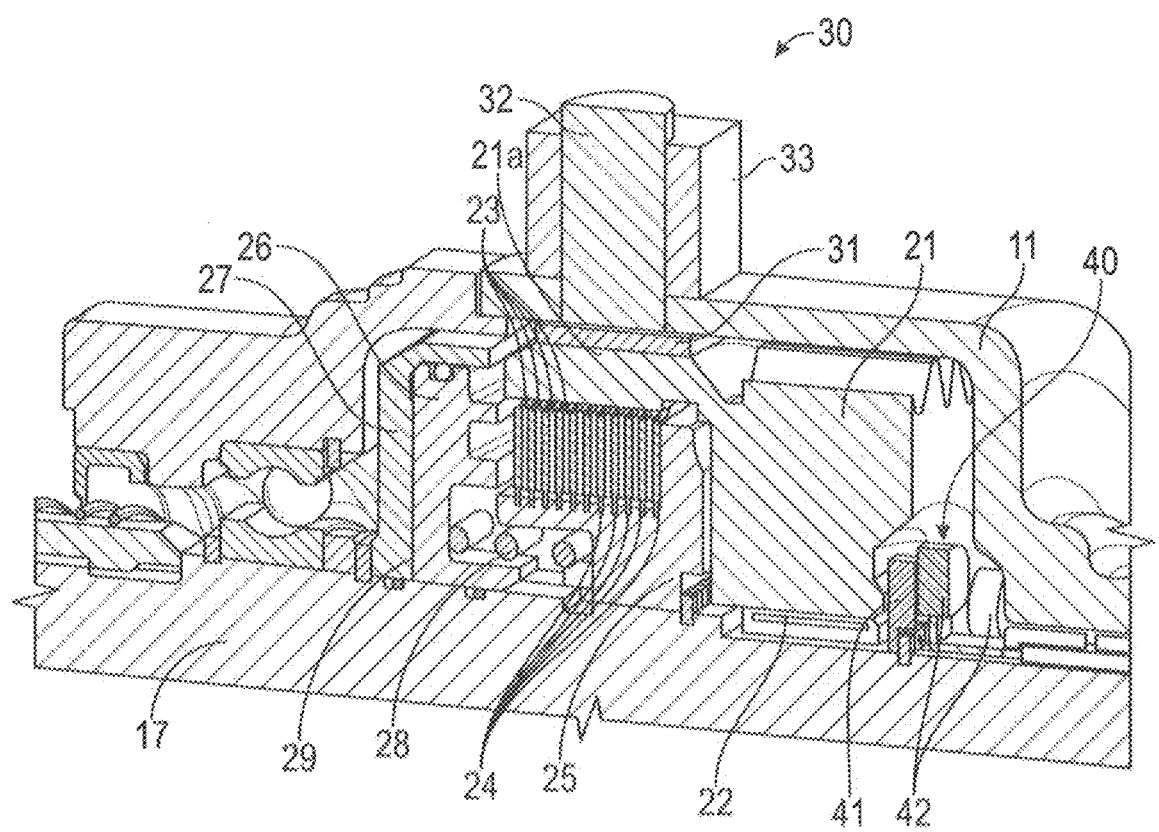
FIG. 2 is an enlarged sectional perspective view of a portion of the power take-off illustrated in FIG. 1, but further illustrating a first embodiment of an eddy current damper for abating gear rattle during operation in accordance with this invention.

FIG. 2 is an enlarged sectional perspective view of a first portion of the power take-off illustrated in FIG. 1, but further illustrating a first portion of an eddy current damper, indicated generally at 30, for abating gear rattle during operation in accordance with this invention. As discussed above, in connection with the power take-off 10 contained within the housing 11, the drive gear 21 is rotatably driven by the upstream drivetrain components, which are the source and contributors of torsional vibrations. The first portion of the eddy current damper 30 includes a ring 31 that, in the illustrated embodiment, is supported on an outer circumferential surface of the hollow cylindrical bell portion 21a of the drive gear 21 for rotation therewith. However, the ring 31 may be supported on any other desired portion of the drive gear 21 or on any other component of the power take-off 10. Preferably, the ring 31 is formed from a highly electrically conductive material, such as copper or certain grades of aluminum. However, the ring 31 may be formed from any desired electrically conductive material.

The first portion of the eddy current damper 30 also includes a core element 32 that is supported on the housing 11 of the power take-off 10. In the illustrated embodiment, the core element 32 is a generally cylindrical rod that is radially aligned with and extends outwardly from the ring 31 supported on the hollow cylindrical bell portion 21a of the drive gear 21. However, the core element 32 may be supported at any desired location on the power take-off 10. Preferably, the core element 32 is formed from a material having a relatively high magnetic permeability. However, the core element 32 may be formed from any desired material. An electromagnetic coil 33 is disposed about a portion of the core element 32 that extends outwardly from the housing 11 of the power take-off 10.

When electrical current is supplied to the electromagnetic coil 33, the electromagnetic coil 33 generates a magnetic field in its interior. This magnetic field is amplified and directed into the interior of the housing 11 of the power take-off 10 by the core element 32. The generated magnetic flux travels axially through the core element 32, departing the inner end thereof, crossing a small circumferential air gap, and passing into and through the ring 31. This magnetic field induces eddy currents in the ring 31 that, in turn, create their own magnetic fields. While the drive gear 21 is rotating, the differential area intersected by the primary magnetic field created by the core element 32 and the electromagnetic coil 33 is non-zero, thereby causing a reaction force that counters the motion driving the area differential. This reaction force is experienced as a drag torque on the ring 31. Because the ring 31 is secured to the drive gear 21, the drive gear 21 also experiences the same drag torque. This drag torque is counter to the rotating direction of the drive gear 21. Therefore, torsional accelerations and decelerations of the drive gear 21 are effectively dampened to prevent undesirable gear rattling from occurring.

The amount of the drag torque exerted on the ring 31 can be adjusted by a drag torque adjuster varying the amount of electrical current that is supplied to the electromagnetic coil 33. The amount of electrical current that is supplied to the electromagnetic coil 33 may be varied by the drag torque adjuster in accordance with any desired parameter, such as an operating condition of the power take-off 10. For example, the amount of electrical current that is supplied to the electromagnetic coil 33 by the drag torque adjuster may be varied in accordance with the rotational speed of a component of the power take-off 10, whether the clutch 16 of the power take-off 10 is engaged or disengaged, and the like.

Figure 3:
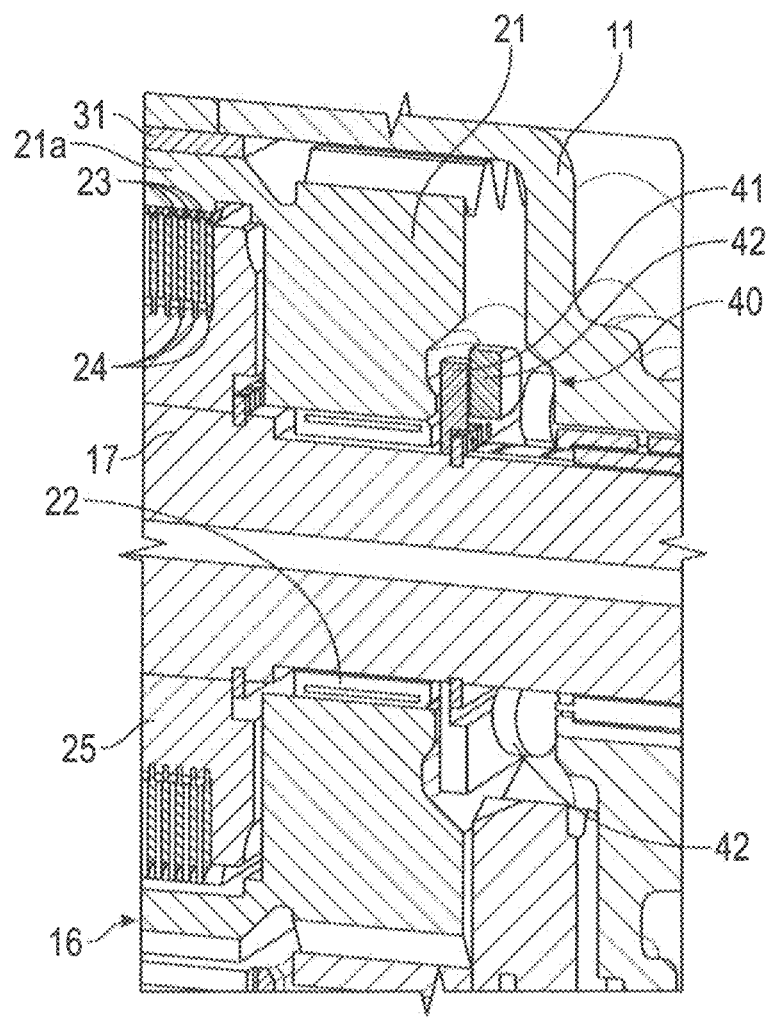
FIG. 3 is an enlarged sectional perspective view of a portion of the power take-off illustrated in FIG. 1, but further illustrating a second embodiment of an eddy current damper for abating gear rattle during operation in accordance with this invention.

FIG. 3 is an enlarged sectional perspective view of a second portion of the power take-off illustrated in FIG. 1, but further illustrating a second portion of an eddy current damper, indicated generally at 40, for abating gear rattle during operation in accordance with this invention. The second portion of the eddy current damper 40 is shown as being used in conjunction with the first portion of the eddy current damper 30. However, the second portion of the eddy current damper 40 may be either omitted or used solely in lieu of the first portion of the eddy current damper 30.

The second portion of the eddy current damper 40 includes a disk 41 that, in the illustrated embodiment, is annular in shape and is connected for rotation with the drive gear 21. However, the disk 41 may have any desired shape and may be connected for rotation with any other desired rotatable component of the power take-off 10. The annular disk 41 is analogous to the ring 31 discussed above and may, if desired, be formed from the same material. The second portion of the eddy current damper 40 also includes one or more magnetic sources 42 that are supported on the housing 11 of the power take-off 10 adjacent to the annular disk 41. The magnetic sources 42 may be embodied, for example, as permanent magnets or any other desired structure or combination of structures that can generate an electromagnetic field or plurality of electromagnetic fields. Also, the magnetic sources 42 may be mounted on any other non-rotatable component of the power take-off 10. The electromagnetic field(s) created by the magnetic source(s) 42 interact with the annular disk 41 in a manner similar to that described above so as to exert a drag torque on the annular disk 41 and effectively dampening torsional accelerations and decelerations of the drive gear 21 to prevent undesirable gear rattling from occurring.

This invention contemplates a variety of structures for achieving the above-described results. For example, the conductive element(s) could be provided on a rotating portion of the power take-off 10, while the magnetic element(s) could be provided on a stationary portion thereof. Alternatively, the conductive element(s) could be provided on a stationary portion of the power take-off 10, while the magnetic element(s) could be provided on a rotating portion thereof. Lastly, the conductive element(s) and the magnetic element(s) could both be provided on rotating portions thereof, such as those having different rotational speeds or those with similar rotational speeds but partially overlapping motions.

Unlike the first portion of the eddy current damper 30 described above, the amount of the drag torque exerted by the second portion of the eddy current damper 40 on the annular disk 41 is constant and not adjustable. Regardless, the second portion of the eddy current damper 40 provides magnet pole faces that are positioned parallel to the annular disk 41, rather than pointing radially at the ring 31 in the first portion of the eddy current damper 30. In this configuration, the magnet poles could be positioned on both sides of the annular disk 41 to increase the amount of magnetic flux and, therefore, the amount of the retarding force.

If desired, the amount of the drag torque exerted by the second portion of the eddy current damper 40 may be made effectively adjustable by providing an alternative structure for varying the amount of interaction between the annular disk 41 and the magnetic sources 42. For example, the power take-off may include a structure for varying the physical position of one or more of the magnetic sources 42 relative to the annular disk 41. Such variations in the physical distance between the annular disk 41 and the magnetic sources 42 would increase or decrease the amount of drag torque exerted by the second portion of the eddy current damper 40. Alternatively, a magnetic flux blocking panel may be provided partially or completely between the annular disk 41 and the magnetic sources 42. Varying the position of the magnetic flux blocking panel would also increase or decrease the amount of drag torque exerted by the second portion of the eddy current damper 40.

Although this invention has been described and illustrated in the context of the electromagnetic coil 31 and the permanent magnets 42, it will be appreciated that other implementations are contemplated. For example, the illustrated magnetics and/or conductors may be implemented in an electric motor configuration, similar to the windings of a rotor and/or stator. All such alternative implementations are considered to be within the scope of the illustrated eddy current dampers.

In sum, this invention provides a magnetic source that is integral to a power take-off and is positioned such that it can advantageously use the laws of magnetism to induce an eddy current in an adjacent rotating conductive element, thereby causing a reactionary drag torque of sufficient magnitude to prevent drivetrain torsional accelerations from being manifested as gear flank rattles in a power take-off. This invention has several distinct advantages over known structures for abating undesirable gear rattling and consequent noise generation. First, this invention requires no physical contact of any moving parts. Such physical contact could result in surface wear that may, over time, degrade the amount of the drag torque, generate excessive heat, and introduce particle contaminants into the power take-off 10. Second, this invention is easily switchable, allowing the application of drag torque to be altered or eliminated as needed. Third, this invention is easily configurable, allowing the magnitude of the drag torque to be adjusted by varying the amount of electrical current that is supplied to the electromagnetic coil 33. Fourth, this invention may be easily retrofit for use in existing power take-off structures. Fifth, this invention does not require physical modification to the power flow path (gears, shafts, housing bores, etc.) that could introduce errors when the noise/vibration/harshness mitigation is not required, but power throughput is.

The core principle of the invention could be expanded by any combination of the following: (1) utilizing multiple magnetic sources in different positions; (2) creating a stator/rotor design more similar to that of an electric motor, whereby the incident magnetic flux is dispersed across a larger area by using additional structural elements; and (3) using permanent magnets rather than electromagnets. Although on/off switchability would be lost without a physical displacement of the magnet, the use of a permanent magnet could eliminate power draw and reduce overall design envelope.

Also, as mentioned above, this invention is not intended to be limited for use only in connection with power take-offs. Rather, this invention may be used with any gear assembly that includes a first gear that is adapted to be rotatably driven by a source of rotational energy and a second gear that is rotatably driven by the first gear. In the same manner as described above, the eddy current damper may be configured to exert a drag torque on either or both of the first and second gears during operation of the power take-off to abate rattling. The eddy current damper could be configured to exert a variable amount of drag torque on either or both of the first and second gears. To accomplish this, the eddy current damper may include a ring that is supported on the first gear and an electromagnetic coil that is supported on a housing supporting the gear assembly. Alternatively, the eddy current damper could be configured to exert a constant amount of drag torque on either or both of the first and second gears. To accomplish this, the eddy current damper may include a disk that is supported on a first gear and a magnetic source that is supported on a housing supporting the gear assembly.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A power take-off that is adapted to be supported on and rotatably driven by a source of rotational energy so as to rotatably drive a rotatably driven accessory, the power take-off comprising:

a hollow housing including a mounting surface that is adapted to be supported on the source of rotational energy, the mounting surface having an opening therethrough;

an input mechanism supported for rotation within the hollow housing and including an input gear that extends through the opening outwardly from the hollow housing and that is adapted to be engaged and rotatably driven by the source of rotational energy;

an output mechanism supported for rotation within the hollow housing and including an output shaft that is adapted to rotatably drive the rotatably driven accessory;

a clutch assembly for selectively connecting the output mechanism and the input mechanism for concurrent rotation, the clutch assembly including a first gear that is connected for rotation with the input mechanism, a second gear that is connected for rotation with the output mechanism, and a shifter assembly that is operable in either an engaged condition, wherein the first gear and the second gear are connected for concurrent rotation, or a disengaged condition, wherein the first gear and the second gear are not connected for concurrent rotation; and an eddy current damper structured and configured to exert a drag torque on either or both of the input mechanism and the output mechanism during operation of the power take-off while the clutch assembly is in the disengaged condition to abate rattling between the first gear and the second gear, wherein the eddy current damper includes:

(1) a ring that is connected to the input mechanism for concurrent rotation and an electromagnetic coil that is supported on the hollow housing of the power take-off; and/or (2) a disk that is connected to the input mechanism for concurrent rotation and a permanent magnet that is supported on the hollow housing of the power take-off.

2. The power take-off defined in claim 1, wherein the eddy current damper is structured and configured to exert a constant amount of the drag torque.

3. The power take-off defined in claim 1, wherein the eddy current damper is structured and configured to exert a variable amount of the drag torque.

4. The power take-off defined in claim 3, wherein the amount of the drag torque is varied in response to an operating condition of the power take-off.

5. The power take-off defined in claim 4, wherein the operating condition of the power take-off is a rotational speed of a component of the power take-off.

6. The power take-off defined in claim 1, wherein the eddy current damper includes both a first portion that is structured and configured to exert a constant amount of the drag torque and a second portion that is structured and configured to exert a variable amount of the drag torque.

7. The power take-off defined in claim 6, wherein the amount of the drag torque is varied in response to an operating condition of the power take-off.

8. The power take-off defined in claim 7, wherein the operating condition of the power take-off is a rotational speed of a component of the power take-off.

9. The power take-off defined in claim 1, wherein the eddy current damper includes the ring that is connected to the input mechanism for concurrent rotation and the electromagnetic coil that is supported on the hollow housing of the power take-off.

10. The power take-off defined in claim 9, wherein the input mechanism includes a drive gear having a hollow bell portion within which the clutch assembly is disposed, and wherein the ring is connected to the hollow bell portion of the drive gear.

11. The power take-off defined in claim 1, wherein the eddy current damper includes the disk that is connected to the input mechanism for concurrent rotation and the permanent magnet that is supported on the hollow housing of the power take-off.

12. The power take-off defined in claim 11, further including a drag torque adjuster for varying an amount of interaction between the disk and the permanent magnet.

13. The power take-off defined in claim 11, wherein the eddy current damper includes a plurality of permanent magnets that is supported on the hollow housing of the power take-off.

14. The power take-off defined in claim 13, further including a drag torque adjuster for varying an amount of interaction between the disk and the plurality of permanent magnets.

15. The power take-off defined in claim 1, wherein the eddy current damper includes both (1) the ring that is connected to the input mechanism for concurrent rotation and the electromagnetic coil that is supported on the hollow housing of the power take-off and (2) the disk that is connected to the input mechanism for concurrent rotation and the permanent magnet that is supported on the hollow housing of the power take-off.

16. The power take-off defined in claim 15, wherein the input mechanism includes a drive gear having a hollow bell portion within which the clutch assembly is disposed, and wherein the ring is connected to the hollow bell portion of the drive gear.

17. The power take-off defined in claim 16, further including a drag torque adjuster for varying an amount of interaction between the disk and the permanent magnet.

18. The power take-off defined in claim 15, wherein a plurality of permanent magnets is supported on the hollow housing of the power take-off.

19. The power take-off defined in claim 18, further including a drag torque adjuster for varying an amount of interaction between the disk and the plurality of permanent magnets.

* * * * *